United States Patent
Herbst

(10) Patent No.: US 9,529,169 B2
(45) Date of Patent: Dec. 27, 2016

(54) LOGGING CABLE

(75) Inventor: Brian Herbst, Easley, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 13/129,914

(22) PCT Filed: Jan. 26, 2011

(86) PCT No.: PCT/US2011/022505
§ 371 (c)(1),
(2), (4) Date: May 18, 2011

(87) PCT Pub. No.: WO2011/094257
PCT Pub. Date: Aug. 4, 2011

(65) Prior Publication Data
US 2011/0280529 A1   Nov. 17, 2011

Related U.S. Application Data

(60) Provisional application No. 61/298,698, filed on Jan. 27, 2010.

(51) Int. Cl.
G02B 6/44 (2006.01)
E21B 47/01 (2012.01)
E21B 47/10 (2012.01)
E21B 47/12 (2012.01)
G01K 11/32 (2006.01)

(52) U.S. Cl.
CPC ............. *G02B 6/443* (2013.01); *E21B 47/011* (2013.01); *E21B 47/102* (2013.01); *E21B 47/123* (2013.01); *G01K 11/32* (2013.01); *G02B 6/4415* (2013.01)

(58) Field of Classification Search
CPC ........................................................ G02B 6/443
USPC .................................................. 385/100–102
See application file for complete search history.

(56) References Cited

U.S. PATENT DOCUMENTS

| | | | |
|---|---|---|---|
| 4,971,420 A | 11/1990 | Smith | |
| 5,493,626 A | 2/1996 | Schultz et al. | |
| 5,495,547 A * | 2/1996 | Rafie et al. | 385/101 |
| 5,555,338 A * | 9/1996 | Haag et al. | 385/101 |
| 6,195,488 B1 * | 2/2001 | Song | 385/101 |
| 6,711,335 B1 * | 3/2004 | Shimizu et al. | 385/128 |
| 6,980,722 B1 | 12/2005 | Ruffa | |
| 6,997,603 B2 * | 2/2006 | Ruffa et al. | 374/137 |
| 7,016,579 B2 | 3/2006 | Militaru et al. | |
| 2006/0165344 A1 * | 7/2006 | Mendez | E21B 47/06 385/13 |
| 2007/0060846 A1 | 3/2007 | Hardin | |
| 2008/0247718 A1 | 10/2008 | Dowd et al. | |
| 2010/0008631 A1 | 1/2010 | Herbst | |

* cited by examiner

*Primary Examiner* — Uyen Chau N Le
*Assistant Examiner* — Chris Chu
(74) *Attorney, Agent, or Firm* — Dority & Manning, P.A.

(57) ABSTRACT

A cable that includes a first optical fiber in a center, a first layer with a plurality of metal wires and a stainless steel tube surrounding the first optical fiber, a second optical fiber inside the stainless steel tube, and a second layer with a plurality of metal wires surrounding the first layer, wherein the first optical fiber is directly exposed to the outside environment.

11 Claims, 2 Drawing Sheets

LOGGING CABLE

CROSS-REFERENCE TO RELATED APPLICATIONS

This application is based upon and claims the benefit of priority from U.S. Provisional Application No. 61/298,698, filed Jan. 27, 2010, the disclosure of which is incorporated herein in their entirety by reference.

BACKGROUND OF THE INVENTION

1. Field of the Invention

The invention is related to a logging-type cable, i.e., a cable that goes in and out of a well repeatedly, that has one fiber directly exposed to the fluids in the well bore and one that is not exposed and is strain free. More particularly, it is related to a high pressure high temperature (HPHT) logging cable.

2. Background

Fiber optic sensing for oil and gas wells is often done with logging cables. These cables typically have a sensing tool attached to the end of the cable as it is lowered into the well. The tool can measure a number of features of the well—physical, chemical and structural properties of the well. The measurements are taken specifically where the tool is located and are either transferred back to the surface via a copper or fiber optic link or may be stored in memory in the tool itself until it can be retrieved. At times, optical fiber can be used in the logging cable and is typically encased in a hermetic stainless steel tube. As mentioned, this fiber can be simply for data transport from the surface to the tool and back. The optical fiber can also be used as a sensor itself to detect temperature along the length of the logging cable using distributed temperature sensing. Ideally, the sensing of various parameters in the well would all be detected along the entire length of the logging cable instead of just at the tool as this would provide the operator of the well added information to assist in maximizing the performance of the well. Sensing technologies now exist to measure the pressure along the length of an optical fiber similar to the way temperature is measured along the length of the optical fiber. The key issue is that the fiber must be exposed to the well bore fluids along its entire length. As an optical fiber is relatively fragile in comparison to the logging cable, the cable design must find the right balance of having the fiber exposed to the well bore fluids yet be protected adequately to ensure the fiber operation is not disrupted due to fiber damage.

BRIEF SUMMARY OF THE INVENTION

Exemplary implementations of the present invention address at least the issues described above and the objects described below. Also, the present invention is not required to address the issues described above or objects described below, and an exemplary implementation of the present invention may not address the issues listed above or objects described below.

An object of the invention is to provide a structure that allows for an optical fiber to be exposed to the environment in which it is placed along its length yet be protected from external mechanical forces such as crushing and abrasion.

Another object of the invention is to provide a structure where the optical fiber is used to sense attributes of the environment such as pressure.

Another object of the invention is to provide a structure that in addition to the exposed optical fiber includes an optical fiber encased in a hermetic structure that protects it from the environment and can be manufactured such that the optical fiber is strain free up to a certain level of strain in the structure.

Another object of the invention is to provide a structure that utilizes metallic wires to create a protective encasement for the optical fiber with the wires periodically deformed to allow exposure to the environment.

Another object of the invention is to provide a structure that places the optical fiber in an interstitial position in a wire stranded structure that allows for the fiber to be exposed to the environment and protects the fiber from direct external forces with a second layer of wires stranded in such a way that the wires are not fully touching each other allowing the environmental conditions to permeate into the cable and be exposed to the optical fiber.

A first embodiment of the invention is a cable that includes a first optical fiber in a center, a first layer with a plurality of metal wires and a stainless steel tube surrounding the first optical fiber, a second optical fiber inside the stainless steel tube, and a second layer with a plurality of metal wires surrounding the first layer.

Another embodiment of the cable may have at least one of the plurality of metal wires in the first layer with a reduced diameter periodically along its length and at least one of the plurality of metal wires in the second layer with a reduced diameter periodically along its length.

Another embodiment of the cable may have only three metal wires in the first layer.

Another embodiment of the cable may have only thirteen wires in the second layer.

In another embodiment of the cable the first layer has a wire fit of approximately 100%.

In another embodiment of the cable the second layer has a wire fit of approximately 100%.

In another embodiment of the cable the at least one of the plurality of metal wires in the first layer has a reduced diameter periodically every approximately one meter along its length and the at least one of the plurality of metal wires in the second layer has a reduced diameter periodically every approximately one meter along its length.

In another embodiment of the cable the cable there is a gel inside the stainless steel tube.

A first embodiment of the invention is a cable that includes a first layer in a center with a plurality of metal wires, a second layer with a plurality of metal wires surrounding the first layer, a stainless steel tube in a first interstitial space between the first and second layers, a first optical fiber in the stainless steel tube, a second optical fiber in a second interstitial space between the first and second layers, and a metal wire in a third interstitial space between the first and second layers.

In another embodiment of the cable the plurality of metal wires in the first layer consists of only three wires.

In another embodiment of the cable the plurality of metal wires in the second layer consists of only sixteen wires.

In another embodiment of the cable the first layer has a wire fit of approximately 100%.

In another embodiment of the cable the second layer has a wire fit of less than 100%.

In another embodiment of the cable the second layer has a wire fit of approximately 93%.

In another embodiment of the cable the second layer has a wire fit of approximately 100% and at least one of the plurality of metal wires in the second layer has a reduced diameter periodically along its length.

In another embodiment of the cable the at least one of the plurality of metal wires in the second layer has a reduced diameter periodically every approximately one meter along its length.

In another embodiment of the cable there is a gel inside the stainless steel tube.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the invention will now be described below by reference to the attached Figures. The described exemplary embodiments are intended to assist the understanding of the invention, and are not intended to limit the scope of the invention in any way.

Figure 1:
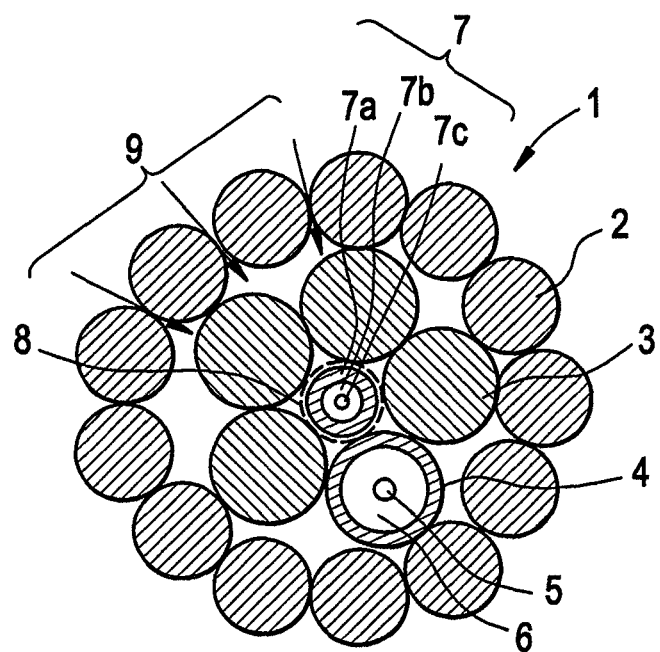
FIG. 1 shows a cross-sectional view of a first embodiment of the cable.

FIG. 1 shows a first embodiment of the cable 1, which has an inner layer with five elements with an optical fiber 7 in the center. The diameter of the cable 1 is ~5.13 mm. The fiber 7 has a diameter of ~0.70 mm. The structure of the optical fiber 7 includes a core and cladding 7c. The core is ~6-10 microns with the clad diameter at ~125 microns. Over the 125 micron cladding is a coating of silicone 7b with a density of ~1.032 to a diameter of ~400 um. Over the silicone is a perfluoroalkoxy (PFA) coating 7a to a diameter of ~700 microns. The optical fiber 7 can withstand high pressures and is typically proof tested to ~100 kpsi but can be at a higher proof test level to improve reliability. However, the invention is not limited to a fiber that is able to withstand high pressures. In addition, the cladding can have a carbon layer that is several angstroms thick to improve fatigue performance in addition to reducing the optical effects of hydrogen. The optical fiber 7 sits in an imaginary circle 8, which has a diameter of ~0.83 mm, that touches the inner layer of wires 3 and the stainless steel tube 4.

Surrounding the optical fiber 7 is an inner layer of four galvanized improved plow steel (GIPS) wires 3 and a stainless steel tube 4 that contains a fiber 5. While GIPS wires are used in this embodiment, other metals such as various grades of stainless steel, high nickel materials like Incoloy or Inconel, or others like Monel could also be used. The GIPS wires 3 have a diameter of ~1.17 mm. The wire density is ~7.87 g/cm$^3$ and can have a tensile strength ranging from ~150 kpsi to 300 kpsi and a modulus of ~29000 kpsi. The temperature coefficient of expansion is ~1.15E-5/deg C. The lay length of the wires and stainless steel tube on this layer is ~50 mm resulting in a wire fit of ~100%, i.e. the wires and the stainless steel tube are in contact which provides a protective core area for the fiber to reside so the fiber is protected from the wires or the stainless steel tube from pressing on it.

Figure 2:
FIG. 2 shows a side view of a GIPS wire that is used in the cable.

One or more of the GIPS wires 3 will have their cross-sectional diameter reduced approximately every meter, to allow optical fiber 7 to be exposed to the lateral hydrostatic pressure from oil or gas. In this particular embodiment, the diameter is reduced by ~0.05 mm. However, any reduced diameter that will allow optical fiber 7 to be exposed to the lateral hydrostatic pressure from oil or gas would be acceptable. FIG. 2 shows the reduced diameters at points 10.

Stainless steel tube 4 has an outside/inside diameter of ~1.17/0.92 mm. The stainless steel tube is a hard drawn tube that can consist of different grades of stainless steel such as, but not limited to, SS 316 and SS 304. The stainless steel tube contains an optical fiber 5 that could be used for temperature sensing with distributed temperature sensing technology. However, the fiber does not have to be used for temperature sensing. The stainless steel tube can have cushioning agent such as a thixotropic gel 6 inside with the fiber to provide for cushioning of the fiber and for hydrogen absorption. However, a gel is not required and the space between the fiber and stainless steel tube can be left open. The stainless steel tube 4 is stranded together with the four GIPS wires 3.

Inside stainless steel tube 4 is an optical fiber 5 with a fiber coating appropriate for the application. For this particular embodiment, the optical fiber 5 is a single mode fiber with a silicone and PFA coating to a final diameter of ~260 microns. The inside diameter of the stainless steel tube is ~0.92 mm so this leaves a free space of ~0.66 mm between the fiber and the inside diameter of the tube. This space, along with the stainless steel tube being helically wound, provides for a strain free window on the cable, i.e. the cable can be tensioned to a certain level before the optical fiber is under strain. The amount of strain free window depends on the lay length or pitch of the tube and the excess length of the optical fiber in the tube. For this embodiment, with a lay length of ~50 mm, the strain free window is ~0.43%. One purpose of having a strain free window is that some optical sensing techniques such as temperature sensing using a brillouin OTDR (optical time domain reflectometer) need to have the fiber strain free to get an accurate temperature reading. The reason for this is this technology measures total strain—mechanical and thermal. To get just the thermal component, it is necessary to have a fiber with no mechanical strain on it. The weight of the cable is simply a sum of the various elements and can be easily calculated knowing the density of the various materials, the diameter and the lay lengths. For this particular design, the total cable weight is ~116 kg/km.

Surrounding the GIPS wires 3 and stainless steel tube 4 is an outer layer of thirteen GIPS wires 2. The outer diameter of the wires can vary which will affect the number of wires. The diameter could be varied to achieve a different over all outer diameter or to achieve a different over all mechanical strength on the cable. The GIPS wires 2 have a diameter of ~0.98 mm with a typical density of ~7.87 g/cm$^3$ and can have a tensile strength ranging from ~150 kpsi to 300 kpsi and a modulus of ~29000 kpsi. The temperature coefficient of expansion is ~1.15E-5/deg C. The lay length of the outer wires is ~75 mm resulting in a wire fit of ~100%. One or more of the GIPS wires 2 also have cross-sectional diameter reduced approximately every meter, to allow optical fiber 7 to be exposed to the lateral hydrostatic pressure from oil or gas. In this particular embodiment, the diameter is reduced by ~0.05 mm. However, any reduced diameter that will allow optical fiber 7 to be exposed to the lateral hydrostatic pressure from oil or gas would be acceptable. FIG. 2 shows the reduced diameters at points 10.

The arrows 9 in FIG. 1 represent the lateral hydrostatic pressure of oil or gas that is applied to the cable.

Figure 3:
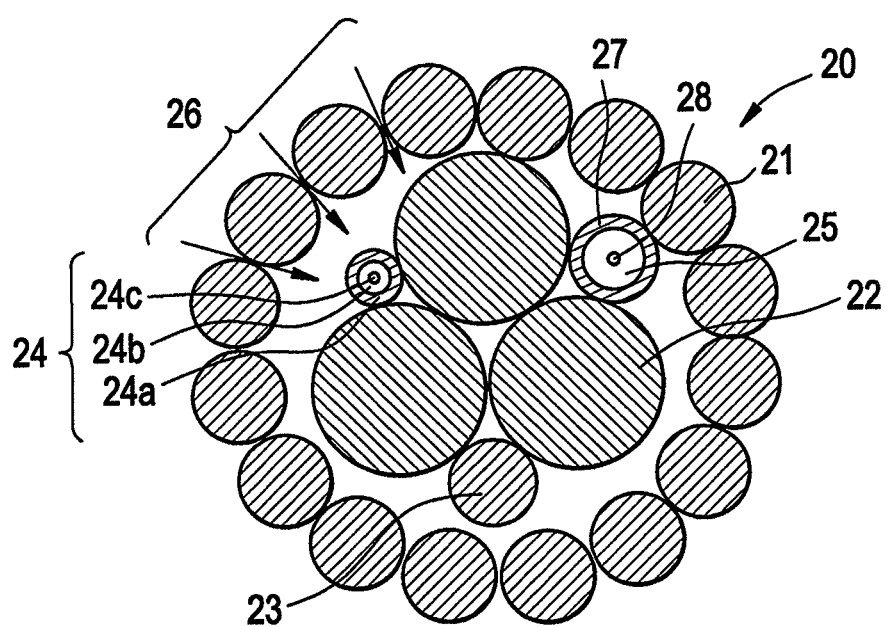
FIG. 3 shows a cross-sectional view of a second embodiment of the cable.

FIG. 3 shows a second embodiment of the cable 20, which has an inner layer with three elements with an optical fiber 24 in the interstitial spaces of the cable. The diameter of the cable 20 is ~7.51 mm.

The inner layer of cable 20 includes three GIPS wires 22. The GIPS wires 20 have a diameter of ~2.42 mm with a typical density of ~7.87 g/cm$^3$ and can have a tensile strength ranging from ~150 kpsi to 300 kpsi and a modulus of ~29000 kpsi. The temperature coefficient of expansion is ~1.15E-5/deg C. The lay length of the outer wires is ~70 mm resulting in a wire fit of ~100%.

The outer layer of cable 20 includes sixteen GIPS wires 21 The outer diameter of the wires can vary which will affect the number of wires. The diameter could be varied to achieve a different over all outer diameter or to achieve a different over all mechanical strength on the cable. The GIPS wires 21 have a diameter of ~1.15 mm with a typical density of ~7.87 g/cm$^3$ and can have a tensile strength ranging from ~150 kpsi to 300 kpsi and a modulus of ~29000 kpsi. The temperature coefficient of expansion is ~1.15E-5/deg C. The lay length of the outer wires is ~100 mm resulting in a wire fit of ~93%. The wire fit is kept below ~100%, and in this embodiment is at ~93%, to allow the optical fiber 24 to be exposed to the lateral hydrostatic pressure from oil or gas, shown as arrows 26. Alternatively, if the wire fit is ~100%, one or more of the GIPS wires 21 could have their cross-sectional diameter reduced approximately every meter, to allow optical fiber 24 to be exposed to the lateral hydrostatic pressure from oil or gas. In this particular embodiment, the diameter is reduced by ~0.05 mm. However, any reduced diameter that will allow optical fiber 24 to be exposed to the lateral hydrostatic pressure from oil or gas would be acceptable. FIG. 2 shows the reduced diameters at points 10.

Optical fiber 24, a stainless steel tube 27 and a GIPS wire 23 are placed in the interstitial spaces between the outer layer of cable 20 and inner layer. In this particular embodiment, stainless steel tube 27 is in a first interstitial space, optical fiber 24 is in a second interstitial space, and GIPS wire 23 is in a third interstitial space.

The optical fiber 24 has a diameter of ~0.70 mm. The structure of the optical fiber 24 includes a core and cladding 24c. The core is ~6-10 microns with the clad diameter at ~125 microns. Over the 125 micron cladding is a coating of silicone 24b with a density of ~1.032 to a diameter of ~400 um. Over the silicone is a PFA coating 24a to a diameter of ~700 microns. The optical fiber 24 is typically proof tested to ~100 kpsi but can be at a higher proof test level to improve reliability. However, the invention does not require the fiber to be able to withstand high pressures. In addition, the cladding can have a carbon layer that is several angstroms thick to improve fatigue performance in addition to reducing the optical effects of hydrogen. Optical fiber 24 is stranded afterwards on a helical strander with a lay length of ~70 mm.

The GIPS wire 23 has a diameter of ~1.17 mm with a typical density of ~7.87 g/cm$^3$ and can have a tensile strength ranging from ~150 kpsi to 300 kpsi and a modulus of ~29000 kpsi. The temperature coefficient of expansion is ~1.15E-5/deg C. The lay length of the outer wires is ~70 mm resulting in a wire fit of ~100%.

Stainless steel tube 27 has an outside/inside diameter of ~1.17/0.92 mm. The stainless steel tube is a hard drawn tube that can consist of different grades of stainless steel such as, but not limited to, SS 316 and SS 304. The stainless steel tube can have a cushioning agent such as a thixotropic gel 25 inside with the fiber to provide for cushioning of the fiber and for hydrogen absorption. However, a gel is not required and the space between the fiber and stainless steel tube can be left open. The stainless steel tube 27 is stranded together with the three GIPS wires 22, the GIPS wire 23 and optical fiber 24 at a lay length, or pitch, of ~70 mm with a wire fit of ~100%.

Inside stainless steel tube 27 is an optical fiber 28 that can be used for temperature sensing with distributed temperature sensing technology. However, the optical fiber 28 does not have to be used for temperature sensing. For this particular embodiment, the optical fiber 28 is a single mode fiber with a silicone and PFA coating to a final diameter of ~260 microns. The inside diameter of the stainless steel tube is ~0.92 mm so this leaves a free space of ~0.66 mm between the fiber and the inside diameter of the tube. This space along with the stainless steel tube being helically wound provides for a strain free window on the cable, i.e. the cable can be tensioned to a certain level before the optical fiber is under strain. The amount of strain free window depends on the lay length or pitch of the tube and the excess length of the optical fiber in the tube. For this embodiment, with a lay length of ~70 mm, the strain free window is ~0.49%. The purpose of having a strain free window is that some optical sensing techniques such as temperature sensing using a brillouin OTDR (optical time domain reflectometer) need to have the fiber strain free to get an accurate temperature reading. The reason for this is this technology measures total strain—mechanical and thermal. To get just the thermal component, it is necessary to have a fiber with no mechanical strain on it. The weight of the cable is simply a sum of the various elements and can be easily calculated knowing the density of the various materials, the diameter and the lay lengths. For this particular design, the total cable weight is ~252 kg/km.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A cable comprising:
   a first layer comprising a first plurality of metal wires, each of the first plurality of the metal wires of the first layer having the same diameter and each of the first plurality of metal wires being in contact with adjacent metal wires in the first plurality of metal wires;
   a second layer comprising a second plurality of metal wires surrounding said first layer;
   a stainless steel tube in a first interstitial space between said first and second layers;
   a protected first optical fiber provided in said stainless steel tube and configured to measure temperature;
   an unprotected second optical fiber provided within the second layer, configured to measure pressure and comprising:
      a PFA coating;
      a silicone coating in said PFA coating; and
      a core and cladding provided in the silicone coating; and
   a metal wire provided in a second interstitial space between said first and second layers, the metal wire having a fully solid metal cross-sectional profile;

wherein the stainless steel tube has a diameter smaller than the diameter of each of the first and second plurality of metal wires in said first layer and said second layer, and wherein the second optical fiber is exposed to external pressure applied to the cable.

2. The cable in claim 1, wherein said plurality of metal wires in said first layer consists of only three wires.

3. The cable in claim 1, wherein said plurality of metal wires in said second layer consists of only sixteen wires.

4. The cable in claim 1, wherein said first layer has a lay length of approximately 100%.

5. The cable in claim 1, wherein said second layer has a wire fit of less than 100%.

6. The cable in claim 1, wherein said second layer has a wire fit of approximately 93%.

7. The cable in claim 1, wherein said second layer has a wire fit of approximately 100%; and wherein at least one of said plurality of metal wires in said second layer has a reduced diameter periodically along its length.

8. The cable in claim 7, wherein at least one of said second plurality of metal wires in said second layer has as reduced diameter periodically every approximately one meter along its length.

9. The cable in claim 1, further comprising a gel inside said stainless steel tube.

10. The cable in claim 1, wherein the second optical fiber has a diameter smaller than the diameter of each of the first and second plurality of metal wires in said first layer and said second layer.

11. The cable in claim 1, wherein the metal wire has a diameter smaller than the diameter of each of the first and second plurality of metal wires in said first layer and said second layer.

* * * * *